United States Patent
Capodieci

Patent Number: 6,143,336
Date of Patent: *Nov. 7, 2000

[54] APPARATUS AND METHOD FOR FORMING CEREAL FOOD PRODUCTS

[75] Inventor: Roberto A. Capodieci, Glen Ellyn, Ill.

[73] Assignee: Mars Incorporated, McLean, Va.

[*] Notice: This patent is subject to a terminal disclaimer.

[21] Appl. No.: 09/206,135

[22] Filed: Dec. 7, 1998

Related U.S. Application Data

[63] Continuation of application No. 08/841,352, Apr. 30, 1997, Pat. No. 5,846,584.

[51] Int. Cl.[7] .................................. A23L 1/00; A23P 1/00
[52] U.S. Cl. ...................... 426/238; 99/451; 4258/174.2; 4258/346; 4258/425; 4258/426; 426/272; 426/285; 426/512
[58] Field of Search .................................. 426/272, 285, 426/238, 512; 425/174.2, 425, 426, 427, 346, 347; 99/451

[56] References Cited

U.S. PATENT DOCUMENTS

5,846,584 12/1998 Capodieci ............................. 426/238

*Primary Examiner*—George C. Yeung
*Attorney, Agent, or Firm*—Cook, Alex, McFarron, Manzo, Cummings & Mehler, Ltd.

[57] ABSTRACT

A apparatus and method for infusing flavors into cereal grains and agglomerating the grains into a unitary food product. Grains of cereal, powdered soluble flavors and a moisturizing liquid are supplied to a mixer. The flavors, liquid and cereal grains are thoroughly mixed and the grains surface moisturized and then discharged into a product-forming chamber which is ultrasonically energized for a sufficient period of time so that the flavors are infused within the interiors of the grains which are agglomerated into a unitary product.

29 Claims, 3 Drawing Sheets

APPARATUS AND METHOD FOR FORMING CEREAL FOOD PRODUCTS

CROSS-REFERENCE TO RELATED APPLICATION

This application is a continuation of U.S. application Ser. No. 08/841,352, filed Apr. 30, 1997 which issued as U.S. Pat. No. 5,846,584 on Dec. 8, 1998.

BACKGROUND OF THE INVENTION

The present invention relates to prepared and packaged food products, and in particular to economical, high speed methods of producing such products. According to the invention, rice and in some cases other cereal products are produced that have selected flavors infused directly into the cereal grains, and the grains are agglomerated into predetermined shapes, preferably shapes permitting accurate portion control.

In recent years, there has been a significant increase in the volume of so-called convenience foods marketed by various manufacturers. While with certain food products, the concept of a "convenience" food has come to have a pejorative connotation, implying that such products are inferior to counterpart foods prepared by ordinary methods, this is not always true. It is also sometimes accepted that convenience foods are characterized by increased cost without any counterpart benefit.

However, it is not necessary that, merely because a food product is able to be packaged for convenient preparation before consumption, such food must be of lower quality than a food prepared by other, more elaborate or painstaking methods. Clearly, the requirement for convenience foods arises from attempts to satisfy the time urgency that is common today. Moreover, considerations of economy incident to small volume uses of food has created a significant demand for portion-controlled food products. Where small portions of food can be made to provide both nutritional satisfaction and flavor variety, consumers purchasing such foods can be freed from the obligation to buy larger-than-desired quantities of the necessary ingredients in order to enjoy a product with a variety of constituent flavors and ingredients.

Another aspect of the adverse connotation of convenience foods has arisen because, where quality is satisfactory or even excellent, such foods cost much more than would appear necessary. Where prices are low, there may have been a substitution of lower quality, more bland, or synthetic materials or flavors in place of natural ingredients. In other cases, the preparation methods result in the degradation of flavors and textures of even high quality, natural products.

One reason for the high cost of preparing convenience foods has been the cost associated with manufacture, i.e., such manufacturing steps are highly time-consuming or require elaborate, expensive equipment, or both. In addition, the need to preserve flavors has sometimes created the requirement for tightly sealed, multi-layer packaging which is so expensive as often to rival the cost of the ingredients themselves.

In view of the failure of the prior art to provide reasonably priced, high quality convenience foods that are economical and yet provide flavor and texture sensations equal to those of non-convenience foods, it is an object of the invention to provide novel methods for preparing convenience foods.

Another object of the invention is to provide novel food products wherein soluble flavors are pre-infused into cereal grains comprising a main portion of the product, thus measurably reducing ingredient cooking times.

Yet another object of the invention is to provide a method of preparing convenience foods wherein the ingredients include rice or other cereals, pasta and a wide variety of flavoring ingredients, including herbs, spices, vegetables, etc.

A further object of the invention is to provide a rice- or other cereal-containing product wherein the flavors are literally infused into unpuffed cereal grains and wherein subsequently required cooking time is measurably reduced in comparison with foods made by other processes.

A still further object of the invention is to provide a method of manufacturing portion-controlled products to provide increased convenience and reduced cost for the user.

An additional object of the invention is to provide a cereal-containing product wherein the flavors are infused from an almost dry condition into the interior of the grains of the rice, other cereal, or pasta, all without extended cooking, or in some cases without real cooking at all.

Another object of the invention is to utilize ultrasonic energy as a means of infusing powdered or other soluble flavors directly into kernels of rice or like food constituents.

Yet another object of the invention is to provide a method of providing convenience foods wherein dried flavors in powdered form as well as particulate vegetable, meat or other ingredients are mixed with rice or other cereal and wherein the flavors are thereafter infused into the cereal grains that are agglomerated by using ultrasonic energy, while the particulate products utilize the ultrasonic energy to become bonded to or agglomerated with adjacent cereal grains.

A further object of the invention is to provide a method which includes the steps of agglomerating rice kernels or like grains into a desired shape at the same time that such grains are infused with various flavors, particularly soluble flavors.

A still further object is to provide a single-step method wherein shaping and forming portion-controlled products can be achieved using ultrasonic energy not only to infuse powdered or dried soluble flavors but also to gelatinize grains sufficiently that they will remain adhered to one another in a desired characteristic shape.

An additional object of the invention is to provide a method wherein a mass of grains may be infused with a flavor, agglomerated and formed into a desired shape within a small fraction of a second.

Another object of the invention is to provide a mass production, high speed method of making convenience food products which can be flow-wrapped as an incident to production.

Yet another object of the invention is to provide an apparatus wherein rice or other cereal grains are thoroughly mixed with dried, powdered flavoring ingredients, wherein the mix is dampened with atomized water and fed to a cavity wherein an ultrasonically energized product-forming tool compresses and imparts energy to the grains confined to the cavity, causing the flavors to be infused into the grains and the grains to be agglomerated into shapes resulting from the cooperative action of the forming tool and the cavity.

A further object of the invention is to provide a low-cost, relatively simple manufacturing apparatus which includes an ultrasonically energized forming tool, cavity forming surfaces and a material feeding portion including means for mixing and measuring predetermined quantities of cereal and flavoring materials dispensed into the forming cavity.

The foregoing and other objects and advantages of the invention are achieved in practice by a method which includes blending dry flavors with grains of rice or other cereal including pastas, slightly moistening the mix to insure that the surfaces of the elements to be agglomerated are properly moisturized, depositing controlled portions of the ingredient into a confined area and utilizing an ultrasonically energized forming tool to confine the grains, flavors and moisture to form a unitary, flavor-infused, agglomerated food product.

The invention also achieves its objects by providing a product made by the foregoing method, with the product being characterized by the presence or absence of additional particulate ingredients such as meat, vegetables or other foods. The invention achieves these and other inherent objects using parboiled rice, puffed cereals, or other suitable ingredients, in some cases also including bits of vegetables, meat, spices or other ingredients.

The exact manner in which the foregoing and other objects and advantages are achieved in practice will become more apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 5 is a perspective view of one preferred form of product made in accordance with the invention and showing certain elements of an ultrasonic forming tool used to infuse the flavors and agglomerate the grains of the new product;

FIG. 6 is a view similar to that of FIG. 5 and showing another preferred form of product and a portion of the tool used to form it;

FIG. 7 is a view similar to that of FIGS. 5 and 6, and showing a still further modified form of food product made according to the invention by the tool shown therein; and, FIG. 8 is a view similar to that of FIGS. 2A–2D, but showing an alternative form of feeding tube and feed mechanism associated with the feed hopper.

DESCRIPTION OF THE PREFERRED EMBODIMENTS OF THE INVENTION

While it will be understood that the present invention may be embodied in a number of forms, and that a wide variety of products may be made to embody the invention, certain concrete examples of the practice of the invention will be given wherein the cereal grains utilized are rice, such as a parboiled rice, arborio rice or other grain products. Some examples will be given wherein the completed product is one still requiring significant cooking during preparation, such as a risotto packaged convenience food product, while other examples will illustrate using the process to form an "instant" soup. In such case, the ingredients include a pre-puffed grain such as puffed rice and wherein preparation requires only a few seconds.

Referring now to the drawings in greater detail, FIGS. 1 and 2A–2D show the invention to be embodied in a processing apparatus generally designated 20 and shown to include a conveyor generally designated 22 having a plurality of support plates 23 hingedly connected to one another to form an upper run 24 of an endless chain or belt for carrying a plurality of individual agglomerated and infused cereal products generally designated 25 away from the forming area.

Figure 1:
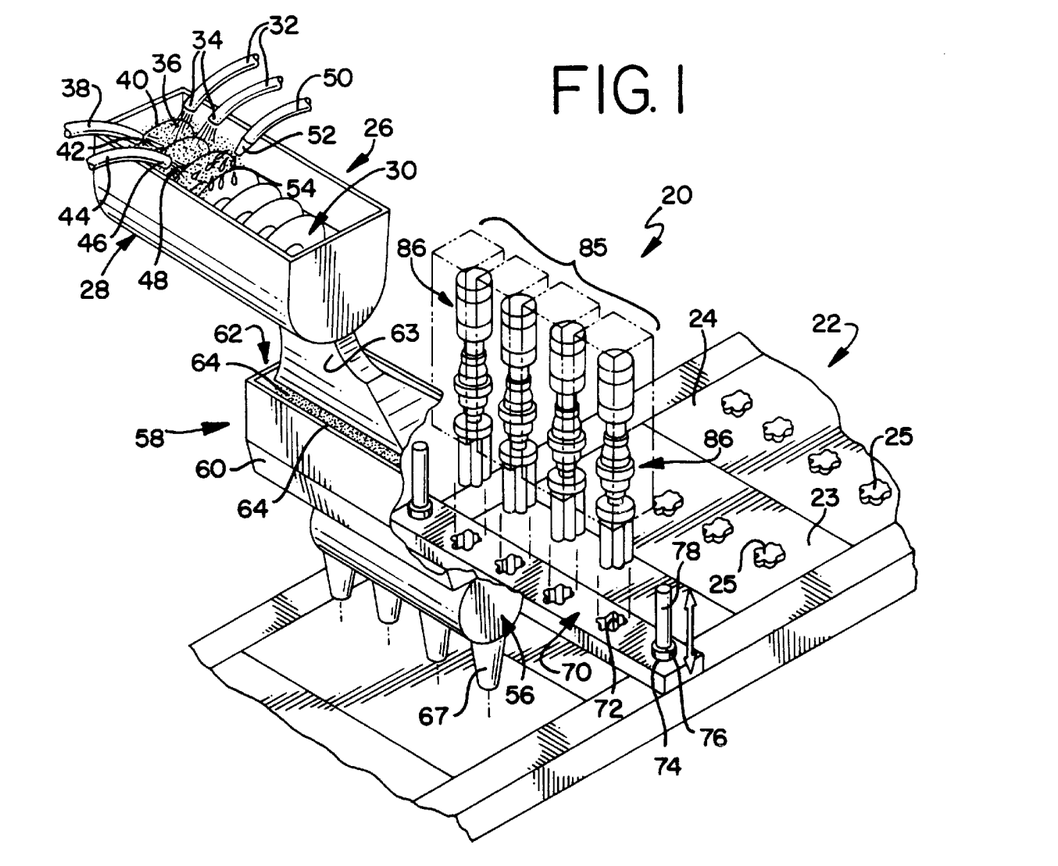
FIG. 1 is a perspective view, partially diagrammatic in nature, showing an agglomerating and infusing apparatus operative to form a mixture of a moistened rice and powered flavors into individual portion-controlled products wherein the flavors are infused into the rice grains.

As shown in FIG. 1, for example, a mixer assembly generally designated 26 includes a mixing container generally designated 28, and a mixing auger or agitator generally designated 30 lying inside the container 28. According to the invention, a plurality of rice feeders 32 are provided, each having a lower outlet 34 from which individual grains 36 of rice are deposited into the interior of the mixing container 28.

Another component of the mixer assembly 26 is a dispenser 38 for powdered or other soluble flavors. The flavor dispenser 38 includes an outlet portion 40 from which powdered or granular dried flavors 42 are deposited into the interior of the mixing container 28. The kind and character of flavors used may vary but exemplary flavors will be described in detail in the Examples and elsewhere herein.

Referring again to FIG. 1, a second feeder 44 is also shown to have an outlet 46 for depositing individual bits or pieces 48 of nutrients such as bits of fruit, vegetables, mushrooms, dry seafood, other grains, spices, or the like. These are also deposited directly from the outlet 46 into the interior of the mixing container 28. Any convenient number of such feeders may be provided.

Still further, the processing apparatus 20 includes at least one moisture-depositing tube 50, having a spray or atomizing nozzle 52 at its lower end, whereby a spray of water 54 or other liquid in atomized or mist form is deposited onto the materials within the mixing container 28. As the materials are deposited (or thereafter if a batch process is used), the auger 30 is rotated so as to ensure a complete mixing of the rice of other grains, the powdered or granular flavors and particulate ingredients, after which the moisture is added. As ill appear, the moisture content of the mix as a whole should be carefully controlled so as to insure the presence of sufficient but not excess moisture. The moisture required is only that necessary for treatment of the kernels' outer surfaces; this added moisture need not and in fact should not penetrate into the kernels.

Referring again to FIG. 1, a feed hopper assembly generally designated 58 is disposed immediately beneath the mixer generally designated 26 for purpose of collecting treated moistened kernels and flavors (with other ingredients, if any) emerging from the downstream end of the mixing container 28 and metering them to the chambers wherein the individual products 25 will ultimately be formed. The feed hopper 58 includes side walls 60, and an interior generally designated 62 and shown to include a supply of treated kernels 64.

FIG. 1 shows a chute 63 for feeding a mix of moisturized kernels 64 and flavors being taken from the downstream end of the mixing container 28 and deposited in the feed hopper 58. As shown in FIG. 1, the feed hopper assembly 58 further includes a measuring and dispensing portion generally designated 56 including a rotary star wheel or drum type dispenser 65 (FIG. 2A) having plural pockets 66. The pockets move between a pickup position, a transfer position, a discharge position and a return position as the drum 65 rotates. When a particular pocket 66 is registered with a hollow collector cone 67, moistened and flavored kernels pass through the cone 67 and exit at the bottom thereof. In the form shown, there are four cones 67. Naturally, any number may be provided, usually one for each of the number of products to be made in one cycle. Each cone 67 has an open discharge end 68.

Another component of the form of apparatus shown in FIGS. 1 and 2A–2D, is a chambered plate generally designated 70 and shown to include a plurality of individual contoured chambers generally designated 72, each defined by relatively vertical side walls and open top and bottom ends. The chambered plate 70 includes outer end portions 74, each of which mounts a guide collar 76 that cooperates with a column style guide 78, insuring accurate vertical movement of the chambered plate 70 in response to movement of a suitable actuator (not shown). In use, when the chambered plate 70 is lowered, its lower surface 80 rests on the upper surface 82 of the support plate 23, its side walls surrounding the depressions or pockets 84 in the surface 82 and closing off the bottoms of the chambers 72.

FIG. 1 also shows that there is an array, generally designated 85, of vertically reciprocable agglomerating and infusing stack assemblies generally designated 86, each comprising plural ultrasonically energized individual components. Each of the stack assemblies 86 includes input power cables 88, an ultrasonic converter 90, an ultrasonic booster 92 and an ultrasonically energized forming tool 94 having a product-forming cavity 96 in its open bottom surface. Power is fed from a power supply (not shown) through the cables 88 to the converter 90 in a manner known to those skilled in the art.

EXAMPLE 1

A charge of dry parboiled rice is introduced into the mixer assembly. This rice is typically contains about 12% moisture when appearing dry to the touch. To make a typical product, a charge of flavoring materials in powdered or liquid form is added. These may typically include saffron, butter, bouillon, salt, and onion flavors, for example. In addition, solid bits are added, including mushrooms, for example. The continuous blender or mixer blends these materials as sufficient water (approximately 3%–5%, based on the weight of the rice,) is sprayed from the atomizing nozzle 52.

Preferably, the blending/mixing action takes place continuously in the mixing container 28 for a short period, i.e., just enough for dispersion and surface moisturizing. Typically, this might be one minute. In FIG. 1, for purposes of illustration, the mixer assembly is shown as being separate from the feed hopper assembly 58. In reality, these units may be combined, or if made separately, they may be positioned more closely adjacent or even remotely from each other, their exact positioning not forming a part of the invention which is novel per se.

Figure 2A:
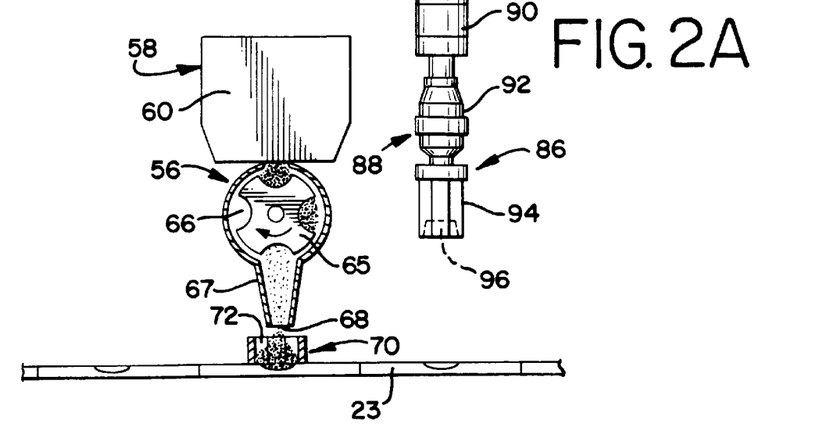
FIG. 2A is a side elevational view, partly diagrammatic in character, and showing a conveyor including plural support plates, a feed hopper, a star wheel feeder and a feeding tube disposed above, and feeding moistened and flavored individual kernels of product into, an open chambered plate positioned upstream of an ultrasonic stack that includes a product-forming tool comprising its lowermost portion.
Figure 2B:
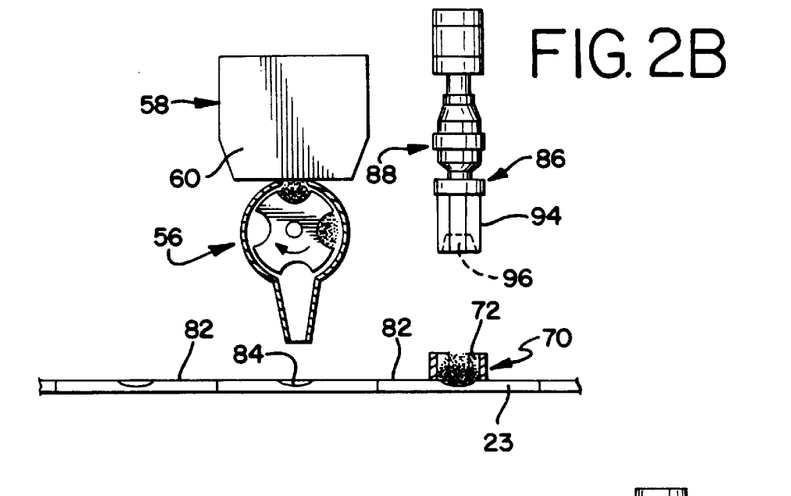
FIG. 2B is a view similar to that of FIG. 2A, and showing the chambered plate and its contents indexed beneath the ultrasonic stack as the star wheel feeder prepares to discharge another portion of ingredients into the chambered plate.

Once the materials have been suitably mixed and moved downstream for dispensing into the feed hopper 58, the chambered plate 70 is positioned as shown in FIG. 2A, i.e., with the outlet or open end 68 above the chamber 72. With the cone 67 positioned in overlying, registered relationship with the individual chambers 72 in the chambered plate 70, the star wheel or drum 65 is rotated, causing a charge of product to be metered into the chambers 72. When the chambers 72 formed by the side walls of the chambered plate 70 and the upper surfaces of the pockets 84 on the support plate 23 are filled to the desired extent, the conveyor is actuated at the support plate 23 and the chambered plate 70 move forward together, to the position shown in FIG. 2B.

Figure 2C:
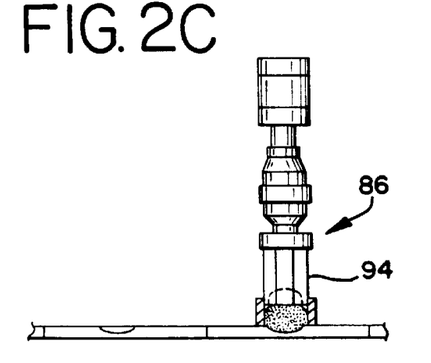
FIG. 2C is a view of a portion of the apparatus of FIGS. 2A and 2B, showing the forming tool engaging the contents of the chambered plate and causing flavor infusion and grain agglomeration.

Thereupon, as shown in FIG. 2C, the ultrasonic stack 88 is lowered until the downwardly facing surfaces of the forming cavity 96 in the tool 94 are fully engaged with the charge of mixed flavors and moistened rice positioned in the chambers 72. A downward pressure is exerted momentarily by the actuator (not shown) for the ultrasonic stack, with the mold surfaces 96 engaging the charge of deposited and partially shaped materials. A dwell time of from about 30 to about 80 milliseconds at a frequency of from about 20 kHz to about 40 kHz and an amplitude of from about 10 to about 100 microns, preferably about 30–60 microns, is effective to infuse the flavors into the rice kernels, and after elapse of a short time, to cause them to become strongly agglomerated.

Figure 2D:
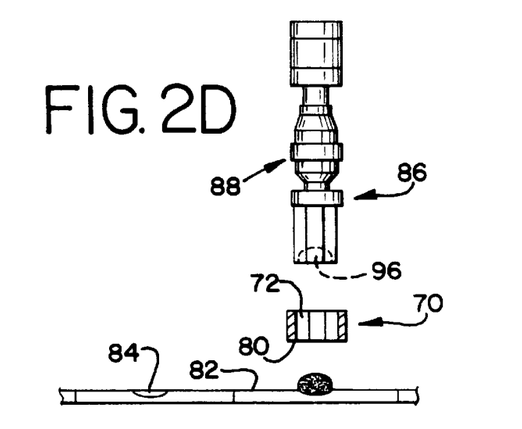
FIG. 2D is a view similar to that of FIG. 2C, showing the forming tool and chambered plate lifted above the conveyor carrying the formed product and showing the chambered plate ready to return to the position of FIG. 2A.

In FIG. 2C, the above-referenced engagement and forming of the product is somewhat schematically illustrated, it being understood that the height of the chamber 72 is preferably somewhat greater than the depth of the cavity 96 in the tool 94 and the height of the individual products 25. Following compression and exposure of the compressed grains to ultrasonic energy transfer, the ultrasonic stack is withdrawn to a fully raised position as shown in FIG. 2D. At this time, the power applied to the stack may be lowered until the next portion of the cycle.

Next, after the product is formed, the chambered plate 70 is raised sufficiently to permit the finished product 25, now positioned by the support plate 23, to be transferred downstream by conveyor movement, i.e., to the right as shown in FIG. 2D. Thereupon, the chambered plate 70 moves to the left and is lowered to the position of FIG. 2A so the above sequence may be repeated.

In FIGS. 2A–2D of the drawings, the extent of actual movement taking place during the illustrated sequences is somewhat exaggerated for clarity.

Figure 3:
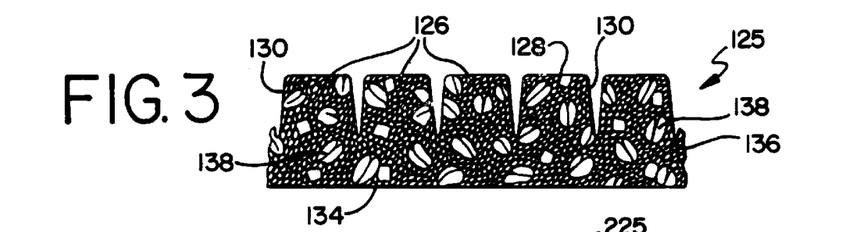
FIG. 3 is a side elevational view of a form of reduced cooking time product made according to the invention, showing rice grains and edible particulate inclusions such as beans, vegetable bits or the like components.

Referring now to various finished products made by the method just described, one such product may be similar to the product 25 of FIGS. 1–2D. Another typical product is shown as product 125 in FIG. 3. This product is preferably of a size of from about 30 gram (instant soup) to about 60 grams (rice meal). If shaped as shown in FIG. 3, for example, such product 125 might contain about 6 to 20 grams per segment. The product 125 of FIG. 3, is shown to include plural individual segments 126 each having a top surface 128 and a plurality of side surfaces 130. The side surfaces are slightly inclined as shown, and do not extend entirely to the bottom surface of the product. Accordingly, the individual segments 126 are accordingly joined by webs 134 of reduced height, forming areas of stress concentration to facilitate breaking the elements into individual portions if and when this is desired for some reason.

In the form shown, the major constituents of the bar include a plurality of rice grains 136, and additional inclusions 138 which may be, by way of example, beans or vegetable bits. According to the invention, the powdered flavors are infused into the rice grains, while the solid particulates (including their own inherent flavors) remain outside the kernels but are bound to the surfaces of the rice grains and/or each other by reason of the ultrasonic treatment. A suitable amount, i.e., about a 50–60 gram portion, of a representative product 125 made as described in Example 1, may be removed from a single package, immersed in a suitable amount of water, and boiled for seven to eight minutes. This produces a risotto product having a fully infused flavor, made from only a single packaged component.

In contrast, a counterpart product made by prior art methods would require opening two packages, combining them and then cooking the ingredients from 15 to 30 minutes.

While the invention is not to be understood as limited to any particular mechanism, or to depend for its operation on any particular theory, it is believed possible that the surface skin of rice or like cereals is relatively continuous and water-impermeable in its natural state. It is believed that the application of ultrasonic energy to the surface of the moistened rice (which is moistened only slightly) during product manufacture is sufficient to induce microscopic cracking or etching of the surface layers of the rice, which greatly increases its surface-to-volume ratio and renders it more porous. This facilitates enabling the flavors (which are now in a soluble, powdered form), to migrate very rapidly into the interior of the individual rice grains or kernels, where they remain absorbed throughout the life of the product, i.e., both prior to and through the time of preparation. During preparation, as described above, the cooking or mixing water rapidly moistens the now flavored interior without displacing the flavors back to the cooking water, creating a highly desirable product made rapidly and economically.

EXAMPLE 2

A product was made which was similar to that described in connection with Example 1, except that the particulate matter comprised chunks of mushrooms, peas, corn, and like materials, as well as the flavors and condiments as set out in connection with Example 1.

The mixing, and the above-described operational steps of the method were carried out in the same way. A highly satisfactory product was created, this time in a single shape of the kind illustrated at 25 in connection with FIG. 1. As with Example 1, a single wrapping was sufficient to enclose the flavored rice and the agglomerated food bits, i.e., all the ingredients needed to make a risotto or like food product of excellent flavor. The wrapping was done on a "flow-wrap" or continuous basis. As is known to those skilled in the art, a continuous sleeve is formed around the product, and heat sealing is used to cut and form package ends as well as side seams, just as individual candy bars are packaged, for example.

EXAMPLE 3

A product was made as described in connection with Example 1, except that flavors and seasoning only, and not solid inclusions were utilized. One such flavor was a dry wine flavoring. The product was made in the same manner as in the foregoing example, and it exhibited excellent flavor and texture when prepared by cooking with sufficient water for a time of about 7–8 minutes.

EXAMPLE 4

A mixed cereal grain product was prepared by adding to the mixer assembly ingredients which included the flavors and condiments just discussed and wherein the cereal component comprised not only rice, but also bits of pasta of a size approximating that of corn kernels or the like. A process similar to that described in connection with Example 1 was carried out. Using starch from the rice and gluten from the pasta, the product, when subjected to energy from the ultrasonic stack, was able to have its constituents adhered and their surfaces to create a unitary, agglomerated or self-adhering product with infused flavors. The product thus prepared was able to be cooked in the same short time and manner as in the prior examples.

EXAMPLE 5

Figure 4:
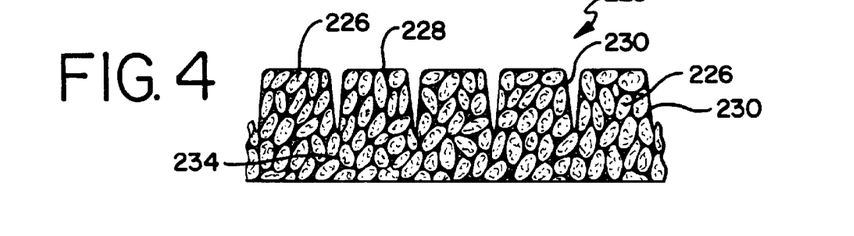
FIG. 4 is a side elevational view of another form of product made according to the invention and illustrating an instant soup product wherein the grains are puffed rice and the preparation time is a matter of seconds.

Referring now to FIG. 4, a different product 225, but one shaped similarly to that of FIG. 3, is shown. In this instance, the product 225 is an edible, soup-forming product having plural individual segments 226, each having a top surface 228 and plural, inclined side surfaces 230. Plural reduced height webs 234 join the individual segments 226 to form the unitary product 225, which is manufactured as described above and wrapped for sale.

In order to produce this product, the same steps as those described above were carried out. In the case of the product 225 of FIG. 4, the chunks of edible products such as mushrooms, peas, carrots, or the like, and the powdered flavors including bouillon, salt, onion and saffron, were the same. However, the grain component consisted of pre-puffed rice kernels 240. In this instance, the residence or contact time between the ultrasonic tool and the contents of the chambers 72 was about 40 milliseconds. The porosity of the puffed rice is much greater than that of untreated rice kernels, enabling the flavors to be dispersed within the body of the kernels in a somewhat shorter time.

However, the ultrasonic energy supplied to the confined mass served to gelatinize the outer surfaces of the expanded or puffed rice granules, causing them to adhere together into a unitary mass. Thus, the subject process demonstrated its ability to provide both rapid flavor dispersion and agglomeration in puffed cereal grains. However, the exact mechanism is believed to be somewhat different insofar as the postulated step of inducing microscopic cracks or etching in the surface of the rice grains was insignificant because of the already porous surface of the expanded kernels.

A product of Example 5 is an instant soup that can be prepared in less than 10 seconds simply by adding very hot or boiling water to the previously prepared and packaged convenience food product. Because the flavors are already infused in the grains or kernels, and because no cooking is required of puffed rice, the product is a truly "instant" product that can be made in a matter of seconds or a minute or two at most.

In the foregoing processes set out by way of example, the upper run 24 of the conveyor 22 was shown to be comprised of a plurality of the individual support plates 23. In this embodiment, the process machinery was of the intermittent motion type wherein the pockets in the support plates were indexed and stopped beneath the discharge outlet of the feed hopper, product ingredients were deposited, and the plate advanced and positioned beneath the forming tool prior to its entry into the chamber where the charge of materials was confined by the chambered plate.

It is apparent that considerable variations to this form of apparatus may be readily made. For example, if the chambered plate is stationary, but the feed hopper 58 is capable of horizontal reciprocation, the apparatus will work equally well. In such instance, the feed hopper would move to a position so that the cones 67 would overlie the chambered plate 70 and discharge a single filling of rice, flavors, etc. After that, the feed hopper would return to the position shown in FIG. 2A, i.e., to the left. Thereupon, the stack 90 would then descend and the infused and agglomerated product would be formed. The sequence following forming would then be similar to that described, including withdrawal of the forming tool, lifting the chambered plate, and indexing the support plate forward.

In a more sophisticated operation, such as the type utilizing servomotor controls, the chambered plate 70 can be moved from an upstream position relative to a fixed point for filling and to a downstream position for forming at a rate synchronous with that of the advance rate of the upper conveyor run. In this embodiment, the feed hopper and the forming tool also follow synchronous motion sequences, with the tools on the lower end of the ultrasonic stack moving into the chambers in the chambered plate 70 while moving synchronously therewith, and each component lifting and rapidly returning to an upstream position between forming cycles.

In such an apparatus, i.e., where the chambered plate 70 moves synchronously with the upper run of the conveyor, the conveyor is not made from individual hinged segments, but is a continuous belt having a rigid support plate beneath those portions of it at which the ultrasonic stack contacts the grains and compresses them. Hence, all that is required is to insure that the treated grains are confined against movement in all directions.

Figures 5, 6, 7, 8:
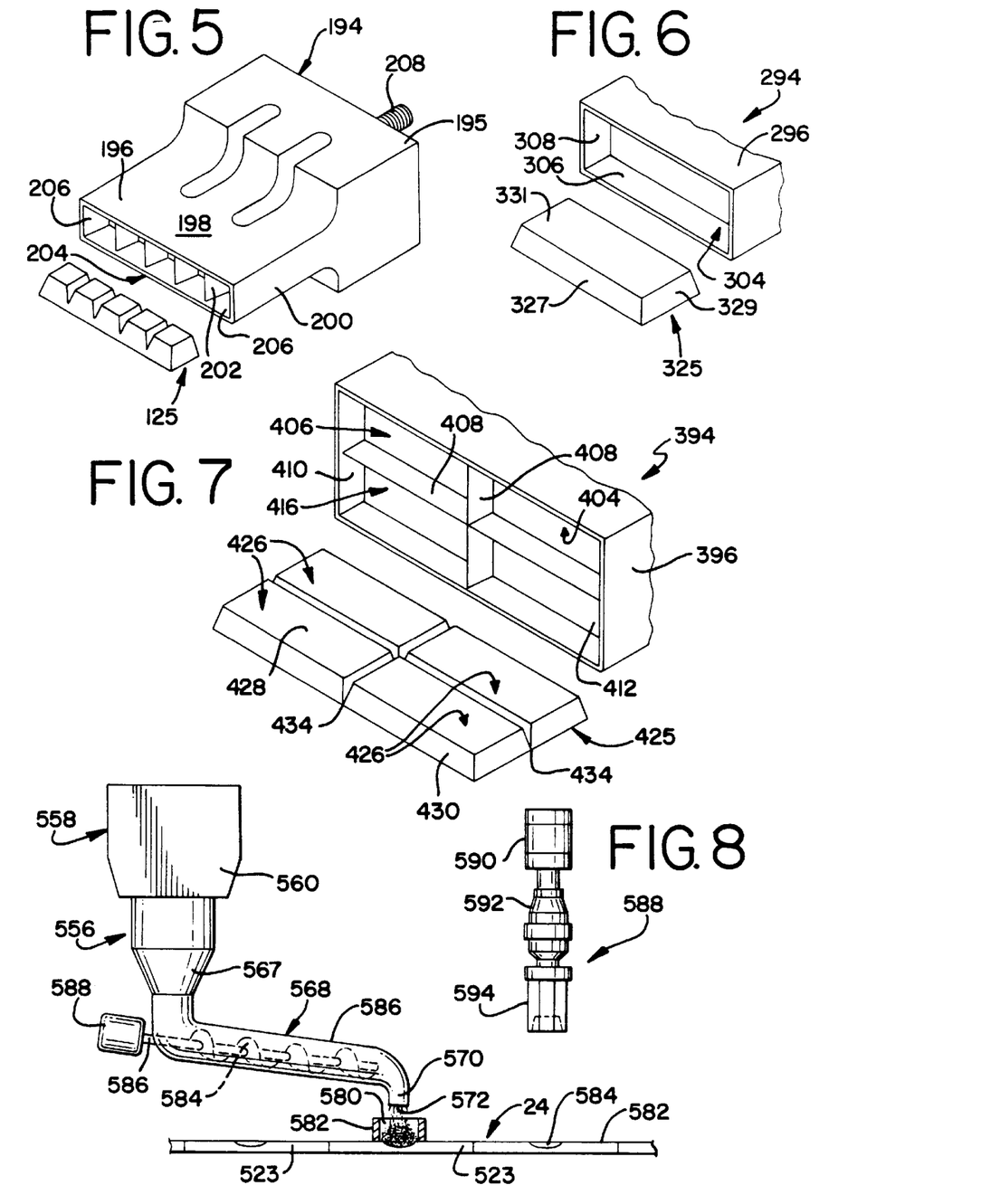

Referring now to FIG. 5, the type of apparatus used to make a segmented product such as that shown in FIG. 3 is illustrated. Thus, in FIG. 5, there is shown in perspective, a forming horn generally designated 194 and shown to have a proximate or enlarged end portion 195 and a narrower, necked down forward portion 196. The exterior side and end walls, 198, 200 and the interior partition walls 202 combine to form a cavity generally designated 204 having a plurality of individual cavity segments 206. Each of these is the reverse shape of the product made therein, such product being illustrated for example as product 125 and corresponding to that shown in FIG. 3. The forming tool 194 is shown to include a stud 208 which may be used for fastening to an associated booster element (not shown in detail) but corresponding generally to the booster unit 92 in FIG. 2A, for example. Cavities of the sort illustrated in forming horns of the approximate shape shown in FIG. 5 have proven to be very effective in use.

Referring now to FIG. 6, an alternate form of product generally designated 325 and having tapered side walls 327 and tapered end walls 329 is shown. The top surface 331 is shown to be generally flat and the bar or like product 325, which might typically comprise 60 grams more or less of product is created in a forming tool generally designated 294.

Only the tip portion 296 of the tool 294 is shown. The forming cavity generally designated 304 of the tool 294 is shown to include cavity side walls 306 and end walls 308.

The forming tool 294 may have a reduced thickness and portion as shown in the embodiment of FIG. 5 or the forming tool may be in the form of a relatively rectangular prism with one or more cavities.

Referring now to FIG. 7, a still further version of a forming tool generally designated 394 is shown. Here, the proximate or forming portion 396 includes a product forming cavity generally designated 404 and shown to be divided into a plurality of individual cavities 406 by partition or divider walls 408 extending both longitudinally and laterally of the cavity. The cavity area 404 as a whole includes side walls 410, with all of the walls 408, 410, etc. being tapered and the interior end walls 412 being generally flat. The product generally designated 425 formed by the tool 394 is shown to have plural individual segments 426, each having flat top surfaces 428 and inclined side walls 430. Reduced height webs 434 separate the elements from one another.

A product such as the product 425 shown in FIG. 7 typically could comprise four 60 gram individual segments, with the segmented bar as a whole thus having approximately 240–260 grams of weight. A plurality of such bars could be regarded as a "family size" unit and be individually packed within a larger, master pack whereby four to six individual bars such as those shown in FIG. 7 would occupy a master pack weighing approximating 1 to 1.5 kg.

Referring now to FIG. 8, there is shown a somewhat modified form of apparatus relative to that shown in FIGS. 1–2D. This apparatus is similar to its counterpart regarding the array of ultrasonic units generally designated 588 including a converter 590, a booster 592 and a forming tool 594. A plurality of support plates 523 are formed into an endless belt forming an upper run generally designated 24 of the conveyor. Plural spaced apart pockets 584 resemble their counterparts and are depressed below the upper surface 582 of the support plates 523. A feed hopper generally designated 558 resembles its counterpart in FIGS. 1–2B. However, the manner of feeding moistened rice kernels and their associated soluble flavors is different. Here, the feeder assembly generally designated 556 includes, in addition to the hopper 560 in the tapering cones 567, a feeder tube generally designated 568 having a lower end 570 with an outlet 572 positionable just above the opening 580 in the chambered plate 582. An auger 584 shown in phantom lines in line inside the inclined center portion 586 of the unit 558 is turned by a shaft 586 driven by an appropriately controlled stepping motor 588. In use, each time the chambered plate 582 is indexed to a position beneath the outlet 572, the motor 588 is actuated sufficiently to advance the auger a given distance to discharge a metered portion of treated granules into the chamber 580 of the plate 582. In other respects, the apparatus operates in a manner similar to that described in connection with the other above embodiments.

It will thus be seen the present invention provides methods and apparatus for infusing cereals grains with flavor and agglomerating such grains into a food product using ultrasonic energy, such methods and apparatus having a number of advantages and characteristics including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention or the scope of the appended claims.

I claim:

1. An apparatus for simultaneously infusing flavors into cereal grains and agglomerating such grains into a unitary food product with said grains containing said infused flavors, said apparatus including a food product ingredient mixer, at least one feeder for depositing individual grains of cereal to be processed into said mixer, at least one feeder for depositing soluble flavors into said mixer, and at least one liquid conduit for moistening said grains and said flavors within said mixer, and a mixer element for said ingredients whereby said flavors, said moisturizing liquid, and said cereal grains are thoroughly mixed and said grains are surface moistened, at least one discharge tube having an outlet portion for delivery of said surface moistened, mixed and flavored grains to a product-forming chamber, a chambered plate containing at least one product-forming chamber, at least one energy transfer unit in the form of a group of elements including a converter for transforming electrical energy into ultrasonic vibration, a booster unit mechanically coupled to said ultrasonic converter, and an ultrasonic tool mechanically secured to said booster unit, said tool having outer walls configured to match the shape of said chamber, said tool also including interior wall portions defining a product-forming tool cavity, said plate and said tool being movable relative to each other whereby, when said converter is actuated and said tool is positioned within said chamber, said cavity in said ultrasonic tool confines and compresses said cereal grains received in said chamber and transfers energy to said grains and said flavors, thereby infusing said flavors into the bodies of said individual cereal grains and causing said cereal grains to adhere to one another so as to form said unitary flavored cereal product.

2. An apparatus as defined in claim 1 wherein said at least one product-forming chamber comprises plural product-forming chambers.

3. An apparatus as defined in claim 1 wherein said at least one product-forming chamber comprises at least four product-forming chambers, and wherein said at least one energy transfer unit comprises an energy transfer unit for each of said chambers.

4. An apparatus as defined in claim 1 wherein said plate is vertically movable between a lowered position wherein product-forming ingredients are confined to said chamber for engagement by said tool and a raised position wherein said unitary product is moved from beneath said plate.

5. An apparatus as defined in claim 1 wherein said outlet portion of said discharge tube is movable between a position in registry with said product-forming chamber and a position wherein said outlet portion is remotely spaced from said product-forming chamber, said plate being movable substantially only vertically.

6. An apparatus as defined in claim 1 wherein said plate is movable both vertically and horizontally, said plate being thereby movable to a position beneath said outlet portion and a position beneath and in registry with said tool.

7. An apparatus as defined in claim 1 wherein said at least one energy transfer unit is movable vertically.

8. An apparatus as defined in claim 1 wherein said at least one energy transfer unit comprises a plurality of energy transfer units, all of said units being vertically movable relative to said plate.

9. An apparatus as defined in claim 1 which further includes an endless conveyor having an upper run made from individual segments, with one of said segments being disposable beneath said plate, and wherein said chambered plate includes plural chambers.

10. An apparatus as defined in claim 1 wherein said at least one energy transfer unit comprises a plurality of energy transfer units, wherein said at least one product-forming chamber comprises plural product-forming chambers disposed in said plate, wherein said at least one outlet portion comprises an outlet portion for each of said chambers, and wherein said outlet portions, said plate, and said energy transfer units are synchronously movable with respect to a support element continuously moving from an upstream position relative to said elements.

11. An apparatus as defined in claim 1 wherein said converter has an output amplitude of at least 30 microns and at output frequency of from about 20 kHz to about 40 kHz.

12. An apparatus for simultaneously infusing flavors into cereal grains and agglomerating such grains into a unitary food product with said grains containing said infused flavors, said apparatus including a support and transfer element for supporting a plurality of individual pieces of a food product, said support element having an upper surface portion constructed and arranged to move forward along a given path, a chamber-forming element having at least one side wall portion of a given configuration defining a chamber for confining a charge of food ingredients including individual cereal grains, soluble flavors and moisture in addition to that present within said cereal grains, a food product ingredient mixer and an ingredient discharge element with an outlet portion, plural feeder elements including at least one feeder for cereal grains, at least one feeder for soluble flavors, and at least one feeder for supplying moisturizing liquid into a mix of said powdered cereal grains and said flavors, a movement mechanism for periodically registering said outlet portion with said chamber in said chamber-forming element, a mechanism for discharging a given volume of said ingredients into said chamber, at least one energy transfer unit in the form of a group of elements including a converter for transforming electrical energy into ultrasonic vibration, a booster unit mechanically coupled to said ultrasonic converter, and an ultrasonic tool mechanically secured to said booster unit, said tool having outer walls configured to match the shape of said chamber, said at least one tool also including interior wall portions defining a product-forming tool cavity, a mechanism for periodically moving said at least one tool into said chamber to compress and shape said given volume of ingredients into a unitary product when said energy transfer unit is energized, a mechanism for withdrawing said tool after forming said product, and a mechanism for repositioning said chamber-forming element relative to said support and transfer element to allow said unitary product thus formed to advance along any given path.

13. An apparatus as defined in claim 12 wherein said support and transfer element comprises a conveyor including a movable outer surface portion and a relatively rigid support portion disposed therebeneath.

14. An apparatus as defined in claim 12 wherein said support and transfer element comprises a conveyor made from a plurality of individual, relatively rigid support plates.

15. An apparatus as defined in claim 12 wherein said chamber-forming element comprises a vertically reciprocable plate having plural chambers therein and wherein said at least one energy transfer unit comprises a transfer unit for each of said chambers in said plate.

16. An apparatus as defined in claim 12 wherein said outlet portion of said discharge element and said chamber-forming element are laterally movable relative to one another.

17. A method of simultaneously infusing flavors into an array of cereal grains and agglomerating such grains into a cohesive unitary flavored product, said method including mixing a plurality of cereals grains with concentrated soluble flavors to create a mixture of grains and flavors, adding moisture in addition to that present in said grains and flavors until said mixture attains a total moisture content, including the moisture present within said cereal grains, of from about 10% to about 18% based on the weight of said cereal grains, thereby forming a moistened mixture, separating said moistened mixture into plural individual groups, confining said groups to a treatment region, contacting said groups with an ultrasonically energized forming tool, compacting said groups of grains and flavors while subjecting said confined groups of grains and flavors to the application of ultrasonic energy for a period sufficient to cause said flavors to be infused within the interiors of said grains and causing said grains to agglomerate into a unitary product, and therefore removing said forming tool from said cohesive flavored product thus formed.

18. A method as defined in claim 17 wherein said total moisture content is from about 13% to about 15%, based on said weight of said cereal grains.

19. A method as defined in claim 17 which further includes mixing additional food ingredients in the form of insoluble food products intended to retain their characteristic texture and flavor.

20. A method as defined in claim 17 wherein said cereal grains include rice.

21. A method as defined in claim 17 wherein said cereal grains comprise primarily arborio rice and parboiled rice.

22. A method as defined in claim 17 wherein said cereal grains comprise pre-puffed rice kernels.

23. A method as defined in claim 17 wherein said cereal grains comprise rice and bits of pasta.

24. A method as defined in claim 17 wherein said cereal grains comprise rice and wherein said flavored product further includes bits of vegetables and mushrooms.

25. A method as defined in claim 17 wherein said period comprises from about 30 to about 100 milliseconds.

26. A method as defined in claim 17 wherein said ultrasonic energy is applied at a frequency of from about 20 kHz to about 40 kHz and wherein said forming tool, in use, undergoes a vibratory amplitude of from about 30 to about 100 microns.

27. A method as defined in claim 17 wherein confining said groups to said treatment region comprises providing a chambered plate having an open top and an open bottom, transiently closing said open bottom of said chambered plate with a support element, and wherein compacting said groups of grains and flavors with said forming tool units, moving said forming tool downwardly through said open top of said chambered plate while said groups are positioned by said support element.

28. A method as defined in claim 17 wherein each of said individual groups comprises at least four units, and wherein each of said units within said group is contacted by its own forming tool.

29. An apparatus for simultaneously infusing flavors into cereal grains and agglomerating such grains into a unitary food product with said grains containing said infused flavors, said apparatus including a food product ingredient mixer, at least one feeder for depositing individual grains of cereal to be processed into said mixer, at least one feeder for depositing soluble flavors into said mixer, and at least one liquid conduit for moistening said grains and said flavors within said mixer, and a mixer element for said ingredients whereby said flavors, said moisturizing liquid, and said cereal grains are thoroughly mixed and said grains are surface moistened, a plurality of discharge tubes each having an outlet portion for delivery of said surface moistened, mixed and flavored grains to an associated product-forming chamber, a chambered plate containing a plurality of product-forming chambers, an array of energy transfer units, each of said units including a converter for transforming electrical energy into ultrasonic vibration, a booster unit mechanically coupled to said ultrasonic converter, and an ultrasonic tool mechanically secured to said booster unit, each of said tools having outer walls configured to match the shapes of said chambers, each of said tools also including interior wall portions defining a product-forming tool cavity, said plate and said array of tools being movable relative to each other whereby, when said converters are actuated and said tools are positioned within said chambers, said cavities in said ultrasonic tools confine and compress said cereal grains received in each of said chambers and transfer energy to said grains and said flavors, thereby infusing said flavors into the bodies of said individual cereal grains and causing said cereal grains within each chamber to adhere to one another so as to form one of said unitary flavored cereal products in each of said chambers.

\* \* \* \* \*